United States Patent
Khan et al.

(10) Patent No.: US 9,645,234 B2
(45) Date of Patent: May 9, 2017

(54) RFID DEVICE, METHODS AND APPLICATIONS

(71) Applicants: Edwin C. Khan, Ithaca, NY (US); Yunfei Ma, Ithaca, NY (US)

(72) Inventors: Edwin C. Khan, Ithaca, NY (US); Yunfei Ma, Ithaca, NY (US)

(73) Assignee: Cornell University, Ithaca, NY (US)

( * ) Notice: Subject to any disclaimer, the term of this patent is extended or adjusted under 35 U.S.C. 154(b) by 299 days.

(21) Appl. No.: 14/413,523

(22) PCT Filed: Jul. 12, 2013

(86) PCT No.: PCT/US2013/050307
§ 371 (c)(1),
(2) Date: Jan. 8, 2015

(87) PCT Pub. No.: WO2014/012012
PCT Pub. Date: Jan. 16, 2014

(65) Prior Publication Data
US 2015/0198708 A1 Jul. 16, 2015

Related U.S. Application Data

(60) Provisional application No. 61/670,635, filed on Jul. 12, 2012.

(51) Int. Cl.
*G01S 13/38* (2006.01)
*G01S 13/84* (2006.01)
(Continued)

(52) U.S. Cl.
CPC .............. *G01S 13/38* (2013.01); *G01S 13/84* (2013.01); *G01S 13/878* (2013.01); *G06K 7/10366* (2013.01); *G01S 2013/466* (2013.01)

(58) Field of Classification Search
CPC ........ G01S 13/38; G01S 13/84; G01S 13/878; G01S 2013/466; G06K 7/10366
(Continued)

(56) References Cited

U.S. PATENT DOCUMENTS 4,063,229 A * 12/1977 Welsh ................ G08B 13/2422
206/807
4,364,043 A * 12/1982 Cole ..................... B61L 25/043
340/10.34
(Continued)

OTHER PUBLICATIONS

F. Yu, Y. Ma and E. C. Kan, "Reflective nonlinear transmission lines for single-antenna non-self-jamming RFID," 2011 IEEE MTT-S International Microwave Symposium, Baltimore, MD, 2011, pp. 1-1.*
(Continued)

*Primary Examiner* — John B Sotomayor
(74) *Attorney, Agent, or Firm* — Burns & Levinson LLP; Orlando Lopez

(57) ABSTRACT

Systems and methods for ranging in indoor environment that are accurate and that are substantially undisturbed by multipath interference. The method includes illuminating a sensor tag with electromagnetic radiation generated from a transceiver; the transceiver are being located a distance away from the sensor tag; the sensor tag comprising at least one nonlinear transmission line (NLTL) for broadband harmonic generation, receiving backscattered electromagnetic radiation from the at least one NLTL at three or more locations; coordinates of the three or more locations being known, obtaining from the phase and magnitude outputs at a second harmonic and at least one sub harmonic of second harmonic, a distance from the sensor tag to each of the three or more locations and trilaterating a location of the sensor tag.

28 Claims, 10 Drawing Sheets

(51) Int. Cl.
  *G01S 13/87*    (2006.01)
  *G06K 7/10*    (2006.01)
  *G01S 13/46*    (2006.01)

(58) Field of Classification Search
  USPC ............ 342/146, 42, 51, 126, 148, 175, 194
  See application file for complete search history.

(56) References Cited

U.S. PATENT DOCUMENTS

| | | | |
|---|---|---|---|
| 5,241,923 A | | 9/1993 | Janning |
| 5,525,993 A | * | 6/1996 | Pobanz ................. G01S 13/751 342/44 |
| 5,699,045 A | * | 12/1997 | Frederick ........... G08B 13/2488 340/551 |
| 6,060,815 A | * | 5/2000 | Nysen .................. G01S 13/758 310/318 |
| 6,788,199 B2 | | 9/2004 | Crabtree et al. |
| 6,812,824 B1 | | 11/2004 | Goldinger et al. |
| 7,152,804 B1 | * | 12/2006 | MacKenzie ...... G06K 19/07749 235/492 |
| 7,286,053 B1 | * | 10/2007 | Gudeman .......... G08B 13/2414 340/572.1 |
| 8,188,908 B2 | | 5/2012 | Landt |
| 8,441,168 B2 | | 5/2013 | Hines et al. |
| 2003/0034887 A1 | | 2/2003 | Crabtree et al. |
| 2007/0126583 A1 | | 6/2007 | Maniwa et al. |
| 2007/0273515 A1 | * | 11/2007 | MacKenzie ...... G06K 19/07749 340/572.1 |
| 2008/0018475 A1 | | 1/2008 | Breed et al. |
| 2008/0042847 A1 | | 2/2008 | Hollister et al. |
| 2009/0109035 A1 | * | 4/2009 | Subramanian ....... G08B 13/242 340/572.8 |
| 2010/0123582 A1 | * | 5/2010 | Smith ................ G08B 13/2414 340/572.3 |
| 2011/0279238 A1 | | 11/2011 | Brommer et al. |
| 2012/0176227 A1 | | 7/2012 | Nikitin |
| 2015/0198708 A1 | * | 7/2015 | Khan ..................... G01S 13/38 342/146 |

OTHER PUBLICATIONS

D. Allane, G. A. Vera, Y. Duroc, R. Touhami and S. Tedjini, "Comparative strategies of exploiting the 3rd harmonic signal energy in passive RFID tags," 2016 IEEE Wireless Power Transfer Conference (WPTC), Aveiro, 2016, pp. 1-3.*

Khan, E. et al. 3D Real-Time Location RF Tag for Human-Machines Interface. Cornell University conference poster, Oct. 2012. Available at www.cctec.cornell.edu.

Khan, E. Non-Self-Jamming Millimeter-Sized Radio-Frequency Identification. Zhejiang University lecture abstract, Mar. 2012. Available at: www.jzu.edu.cn.

Yu, F. Harmonic generation from integrated nonlinear transmission lines for RFID applications. IEEE MTT-S International Microwave Symposium Digest, Apr. 2010, p. 1.

* cited by examiner

RFID DEVICE, METHODS AND APPLICATIONS

CROSS-REFERENCE TO RELATED APPLICATIONS

This application is a U.S. national stage application under 35 U.S.C. 371 of co-pending International Application No. PCT/US13/50307 filed on Jul. 12, 2013 and entitled RFID DEVICE, METHODS AND APPLICATIONS, which in turn claims priority to U.S. Provisional Patent Application No. 61/670,635 filed on Jul. 12, 2012, which is incorporated by reference herein in its entirety for all purposes.

STATEMENT REGARDING FEDERALLY-SPONSORED RESEARCH OR DEVELOPMENT

This invention was made with Government support under grant number CMMI-0928596 awarded by the National Science Foundation. The United States Government has certain rights in the invention.

BACKGROUND

The present disclosure is directed to indoor real-time locating systems (RTLS), methods, and associated applications.

Short-distance, high accuracy ranging is important for many applications such as indoor navigation, body area network (BAN) and unobstructed motion tracking. Meanwhile, recent development in radio-frequency identification (RFID) systems for efficient asset management has made RFID tags and associated devices widely available with low-cost and low-energy consumption. Among RFID ranging methods, received signal strength (RSS) can work over large areas, but suffers from poor accuracy. Time of flight (TOF) is not suitable for short range due to the difficulty in measuring small round-trip time delay. Continuous-wave (CW) phase-based methods using single-tone carriers are preferred for their high accuracy and simple architecture.

However, in indoor environment, passive CW phase ranging by backscattering RFID tags can be challenging. Physically, phase errors caused by multi-path interference are severe in offices and other indoor locales. Poor isolation between transmitting and receiving ends brings strong self-interference that can also smear phase detection. Neighboring readers can also cause strong interference without effective solution by synchronization. Another limitation comes from signal processing. Although CW can be accurate, cycle ambiguity exists when distance is longer than one wavelength. The cycle integer must be solved correctly in order to get high precision. The sensing bandwidth in conventional methods such as DFCW (dual-frequency continuous wave) can be limited by: (1) reading range within which integer ambiguity can be solved or (2) narrowband RFID devices with large phase errors. Although RFID tags with harmonic generation have been proposed, the proposed tags do not address cycle ambiguity.

There is a need for systems and methods for ranging in indoor environment that are accurate, substantially undisturbed by multipath interference and resolve cycle ambiguity.

SUMMARY

Systems and methods for ranging in indoor environment that are accurate and that are substantially undisturbed by multipath interference and resolve cycle ambiguity are disclosed herein below.

In one or more embodiments, the method of the present disclosure includes illuminating a sensor tag with electromagnetic radiation generated from a transceiver; the transceiver are being located a distance away from the sensor tag; the sensor tag comprising at least one nonlinear transmission line (NLTL) for matched impedance, broadband harmonic generation; coordinates of the three or more locations of the reader receiving antenna being known, obtaining, from the phase and magnitude outputs at a second harmonic, ranges from the sensor tag to each of the three or more antenna locations and trilaterating a location of the sensor tag.

In one or more embodiments, the system of the present disclosure includes a sensor tag having at least one nonlinear transmission line (NLTL) for broadband harmonic generation, a transceiver, a reader including three or more antennas, coordinates of the three or more locations being known, at least one demodulator providing in-phase and quadrature outputs at the second harmonic of a principal frequency of the electromagnetic radiation emitted from the transceiver, a distance from each one of said three or more locations to the sensor tag. In one instance, the transceiver is incorporated in the reader and includes one or more of the three or more antennas.

Other embodiments are also disclosed.

For a better understanding of the present teachings, together with other and further objects thereof, reference is made to the accompanying drawings and detailed description and its scope will be pointed out in the appended claims.

DETAILED DESCRIPTION

Figure 1A:
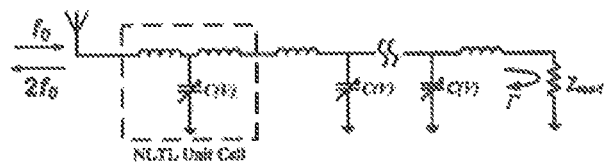
FIGS. 1a, 1b, 1c are a schematic representation of a nonlinear transmission line (NLTL)

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

"Trilateration," as used herein, is the process of finding the coordinates of one node given the distances from that node to three or more other nodes of known coordinates (see, for example, Alan Kaminsky, Trilateration available at http://www.cs.rit.edu/~ark/543/module05/trilateration.pdf). Herein, Trilateration is also referred to as triangulation.

"Subharmonic," as used herein, refers to a frequency given by a center frequency increased or decreased by a frequency variation where the frequency variations are within a bandwidth around the center frequency, the bandwidth being less than the separation between the center frequency and the closest harmonic.

In on or more embodiments, the method of the present disclosure includes illuminating a sensor tag with electromagnetic radiation emitted from at least one transceiver; the transceiver are being located a distance away from the sensor tag; the sensor tag comprising at least one nonlinear transmission line (NLTL) for broadband harmonic generation, receiving backscattered electromagnetic radiation from the at least one NLTL at three or more locations; coordinates of the three or more locations being known, obtaining, from the phase and magnitude outputs at a second harmonic and at least one subharmonic of second harmonic, range from the sensor tag to each of the three or more locations and trilaterating a location of the sensor tag.

In other embodiments, the method of the present disclosure includes illuminating a sensor tag with electromagnetic radiation generated from a transceiver; the transceiver are being located a distance away from the sensor tag; the sensor tag comprising at least one nonlinear transmission line (NLTL) for matched impedance, broadband harmonic generation; coordinates of the three or more locations of the reader receiving antenna being known, obtaining, from the phase and magnitude outputs at a second harmonic, ranges from the sensor tag to each of the three or more antenna locations and trilaterating a location of the sensor tag.

In one or more embodiments, the system of the present disclosure includes a sensor tag having at least one nonlinear transmission line (NLTL) for broadband harmonic generation, at least one transceiver, a reader including three or more antennas, each one antenna from the three or more antennas being located at one location from three or more locations, coordinates of the three or more locations being known, at least one demodulator providing in phase and quadrature outputs at a second harmonic of a principal frequency of the electromagnetic radiation emitted from the transceiver and at one or more subharmonics of the second harmonic and a ranging component configured to provide, from the in phase and quadrature outputs at the second harmonic and at the one or more subharmonics, a distance from each one of said three or more locations to the sensor tag. In one instance, the transceiver is incorporated in the reader and includes one or more of the three or more antennas.

In other embodiments, the system of the present disclosure includes a sensor tag having at least one nonlinear transmission line (NLTL) for broadband harmonic generation, a transceiver, a reader including three or more antennas, coordinates of the three or more locations being known, at least one demodulator providing in-phase and quadrature outputs at the second harmonic of a principal frequency of the electromagnetic radiation emitted from the transceiver, a distance from each one of said three or more locations to the sensor tag. In one instance, the transceiver is incorporated in the reader and includes one or more of the three or more antennas.

In one non-limiting embodiment, the present disclosure provides a system and method for localization using harmonic RFID tags in indoor environments with accuracy in the millimeter range by measuring Continuous Wave (CW) phase information at multi-frequencies. With the integration of Nonlinear Transmission Lines (NLTLs), second harmonic (SH) is passively generated during backscattering with high efficiency compared to other approaches (e.g. discrete diodes). Phase information is obtained from SH, solving the multi-path interference by emitted and reflected signals in conventional backscattered RFID tags, which often restricts indoor applications. NLTLs are designed with broadband or multi-band properties, offering ready matching to antenna front-end and advantages of adopting multiple frequencies for solving phase ambiguity. The system of this invention is cost effective because NLTLs can be implemented with standard CMOS technology, and CW simplifies reader design for signal generation and detection.

In another non-limiting embodiment, the NLTL RFID tag can be made by CMOS technology or printed circuit board with a specific design of antenna. The NLTL harmonic RFID tag can ne attached to any object of interest and the backscattered second harmonic phases generated. The distance from the tag to at least 4 fixed antenna locations is determined using trilateration (or triangulation) methods. In one embodiment, the determined location is used as the immobile tag ID in the indoor network.

For systems with form factors larger than 5 cm, printed circuit board assembly with around 100 MHz-900 MHz operations is most feasible. For systems with form factors smaller than 5 mm, a CMOS chip implementation will be preferred.

Salient Features of the present disclosure include:

Integration with NLTL for harmonic generation to solve multi-path interference problems.

Broadband or Multi-band properties of the RFID tag, easy for antenna matching.

Use of phase modulation in harmonic RFID operations

Adopting continuous wave to simplify reader design.

High positioning accuracy (to the range of millimeter).

In another aspect, the present disclosure can be treated as a short-range real-time localization tool that can be applied to the human-machine interface and collision avoidance.

Probable uses include real-time object localization, security monitoring, inventory management, and multiplexing nondirectional remote reading.

Figure 1B:
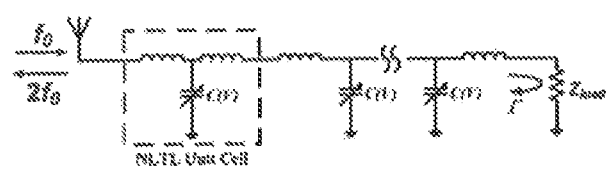
Figure 1C:
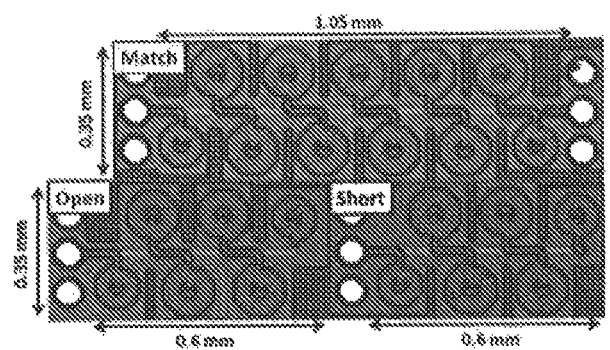

In the backscattered NLTL-based harmonic RFID tag described in appendix C of U.S. Provisional Application No. 61/61/670,635 (and also in F. Yu, K. G. Lyon and E. C. Kan, "A novel passive RFID transponder using harmonic generation of nonlinear transmission lines", IEEE Trans. Microwave Theory and Techniques (WTI), vol. 58, no. 12, pp. 4121-4127, December 2010, F. Yu, Y. Ma, K. G. Lyon and E. C. Kan, "Reflective nonlinear transmission lines for single-antenna non-self-jamming RFID", *IEEE MTT* 2011 *International Microwave Symp.* Baltimore, Md., Jun. 5-10, 2011, all of which are incorporated by reference herein in their entirety and for all purposes), in either matched or reflective configurations as shown in FIG. 1, the sensor signal is coded on the 2nd harmonic of the transceiver signal received by the RFID tag. Hence, the self interference and multi-path backscattering are mostly eliminated, if the ambient does not have objects with nonlinear conversion in the given frequency range. FIGS. 1a, 1b show the circuit model of the (a) matched and (b) reflective NLTL designs. The die photo for both designs are shown in FIG. 1(c). The reflective NLTL uses only one antenna and $Z_{load}$ can represent a sensor capacitor whose magnitude gives an additional phase shift to the reflective wave The matched design has a broader bandwidth than the reflective one, but needs two antennas and the sensor integration can only be done as a DC offset to the varactor. The reflective design has a smaller footprint due to (1) the single antenna configuration and (2) the wave traveling two times on the transmission line so that the number of NLTL stages for harmonic generation is halved. The sensor can be integrated as the transmission line termination Zload in the reflective design, which transduces the sensor output as an additional phase shift. This is the smallest and longest range of non-self-jamming passive RFID developed to date.

Compared with the single-diode frequency multiplier, the NLTL has shown more efficient harmonic generation because the Bragg frequency fB prevents power spreading to the spectrum above the desired harmonic. In addition, the NLTL's positive real impedances also provide ready matching and relatively broad bandwidth with no need of matching network in both matched and reflective configurations. By the sensor capacitance as Zload, the transponder is capable of Amplitude Shift Keying (ASK), Phase Shift Keying (PSK) and other similar coding schemes. The die photos of both configurations in the IBM 0.13 μm CMOS process are shown in FIG. 1(c).

The experimental RFID measurements are shown in FIG. 2. FIGS. 2a-2d show experimental measurements of the non-self-jamming passive RFID. FIG. 2a shows Range characterization in matched NLTL designs with 20 dBm reader power and average antenna gain of −1.2 to +3.0 dBi; FIG. 2b shows PSK sensor capacitance modulation; FIG. 2c shows $2^{nd}$ harmonic conversion in reflective NLTL; FIG. 2d shows Range characterization in reflective NLTL RFID. Referring to FIG. 2c, since the illumination from the transceiver typically has a narrow range of initial frequencies, the backscattering from the NLTL is broad band harmonic backscattering.

The reading range can be readily extended to up to 10 meters by using higher reader power and/or improved antennas with higher efficiency. For capacitive sensors as the last stage for PSK, 0.25°/fF for RFID with fB=10 GHz and 0.61°/fF with fB=15 GHz have been demonstrated. The steeper slope corresponds to higher sensitivity while the smaller slope to larger range of detection.

Figure 2A:
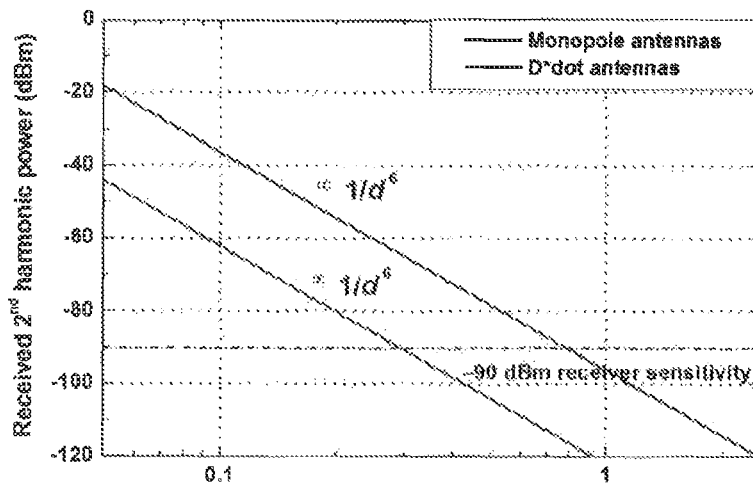
FIGS. 2a-2d is a graphical representation of measurements of an RFID tag of these teachings.
Figure 2B:
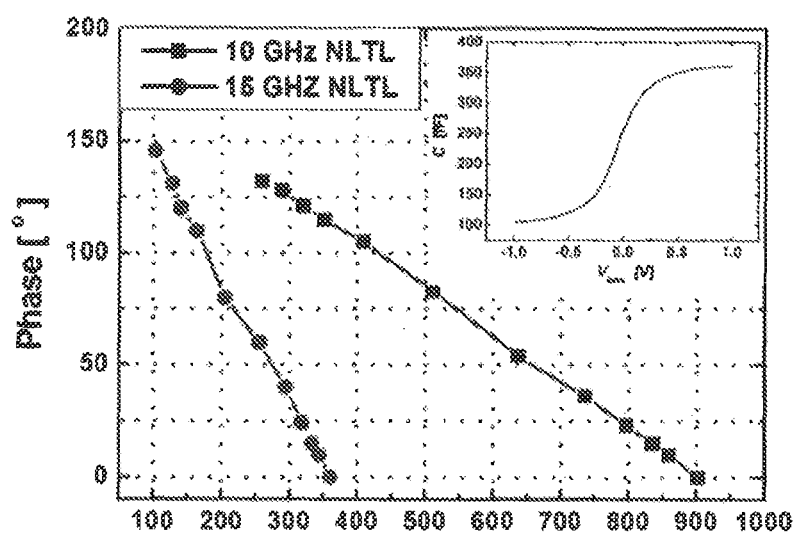
Figure 2C:
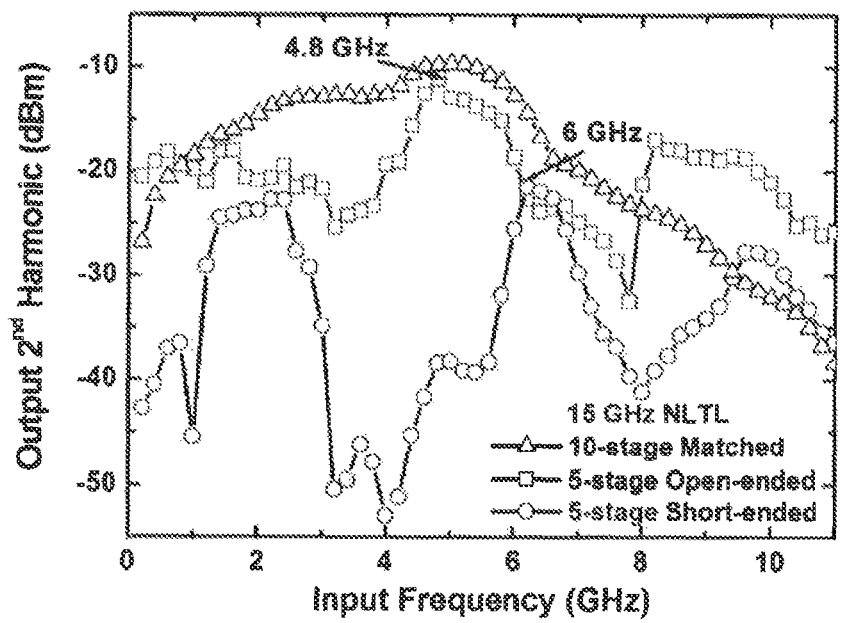
Figure 2D:
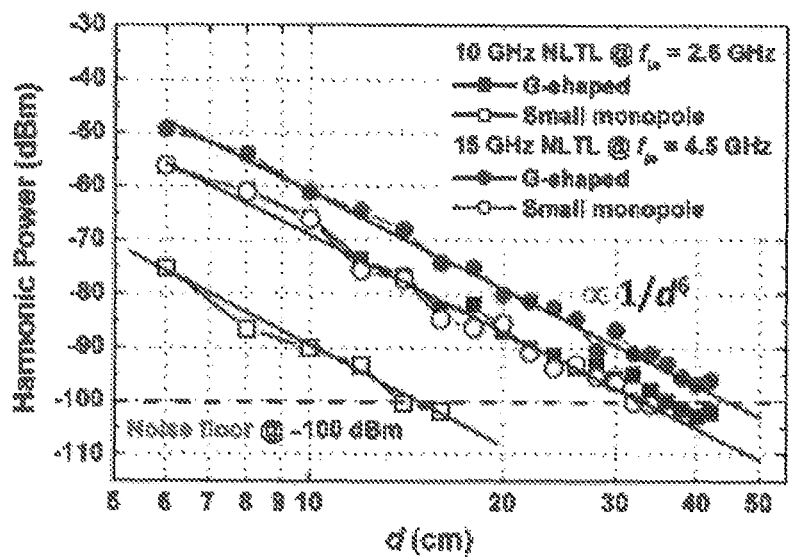

Reflective NLTL, where $Z_{load}$ as an open load is used for the transmission line termination, can use only one antenna. The single antenna needs to have high efficiency for the fundamental and the $2^{nd}$ harmonic frequency. In FIGS. 2(c) and 2(d), open-circuited reflective NLTL is characterized with the dual-band G-shape antenna and the broadband D-dot antenna (see, for example, J. Andrews. Picosecond Pulse Labs. Application note-UWB Signal Sources. Antennas and Propagation 2003, which is incorporated by reference herein in its entirety and for all purposes).

Figure 5B:
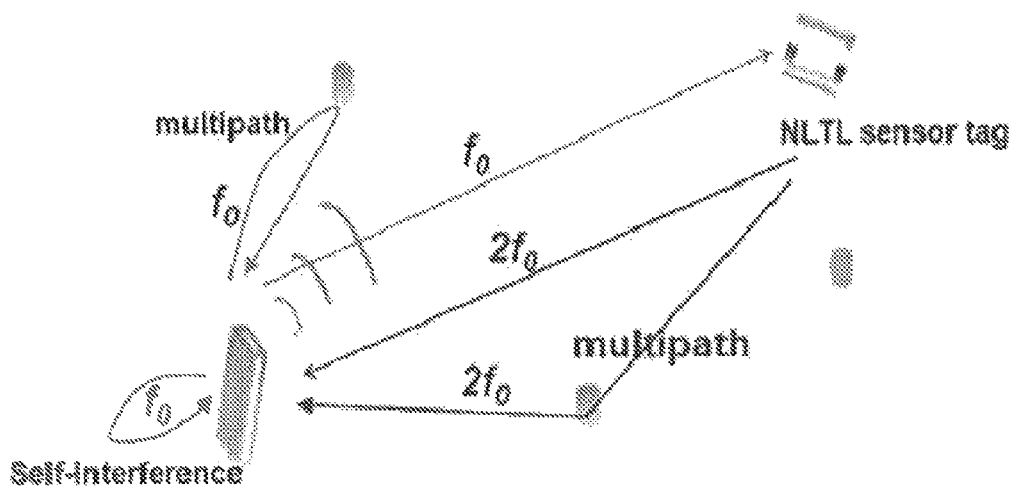
FIGS. 5a, 5b are graphical representations of the operation of a conventional RFID tag and an RFID tag of the present teachings.
Figure 5A:
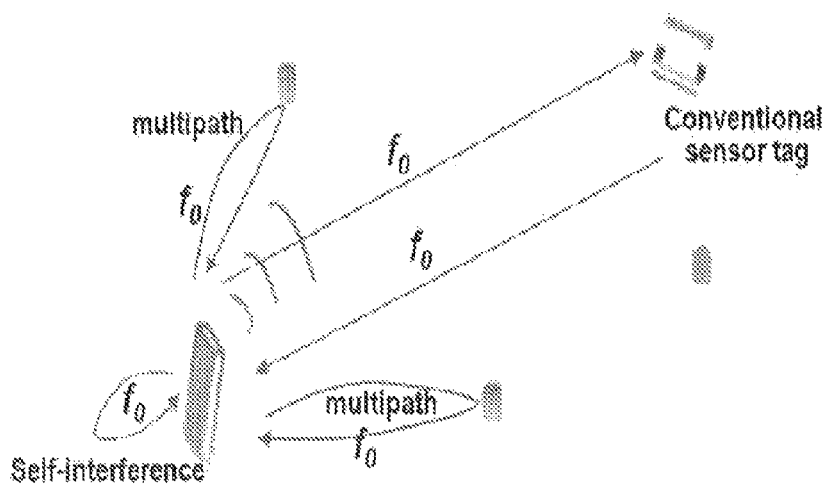

Passive sensor tags are much better in consideration of the distributed tag deployment and maintenance, as no battery to be replaced or no nearby RF source is needed, which can cause interference or health concerns if the power is more than 32 dBm. Other advantages are shown in FIG. 5.

Figure 3:
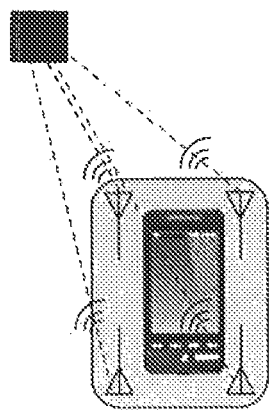
FIG. 3 is a schematic representation of one embodiment of the system of the present teachings.
Figure 6:
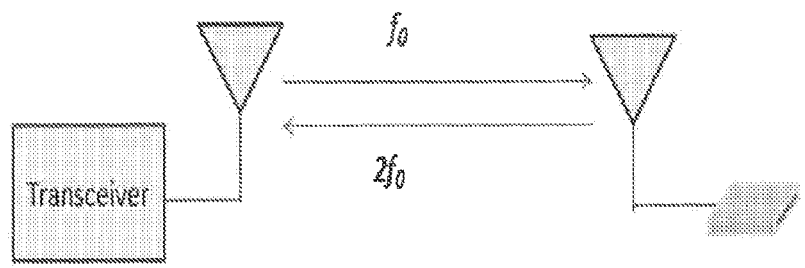
FIG. 6 is a graphical representation of the ranging operation of the RFID tag of the present teachings.

However, the sensor tag will still need an "ID" so that the location can be known for better control and monitoring. For structural health, pinpointing the exact location of sensor data is of paramount values in determining the degree of the problems. One embodiment of the method of these teachings is used for tag location determination, and the determined location is, in one embodiment, used as the immobile tag ID in the indoor network. (One embodiment of tag location is shown in FIG. 6.) Distance to the reader can be readily determined in the phase modulation of the NLTL by running two interrogating frequencies, but at least three reading position is needed in order to triangulate (trilaterate) the exact position. Borrowing from the GPS (global positioning system) concepts, in one embodiment, 4-6 reader antenna positions are used to resolve ambiguity and treat multi-path interference at the same time. In one embodiment, only one reader is needed, but the power will be derived to the 4-6 antennas with known accurate relative positions. This can be achieved with additional packaging to redirect the radiation power from different positions without resorting to change of the central reader configuration, as shown in FIG. 3, which shows Passive tag triangulation from the four antennas on a backpack of the cell phone reader.

Figure 3A:
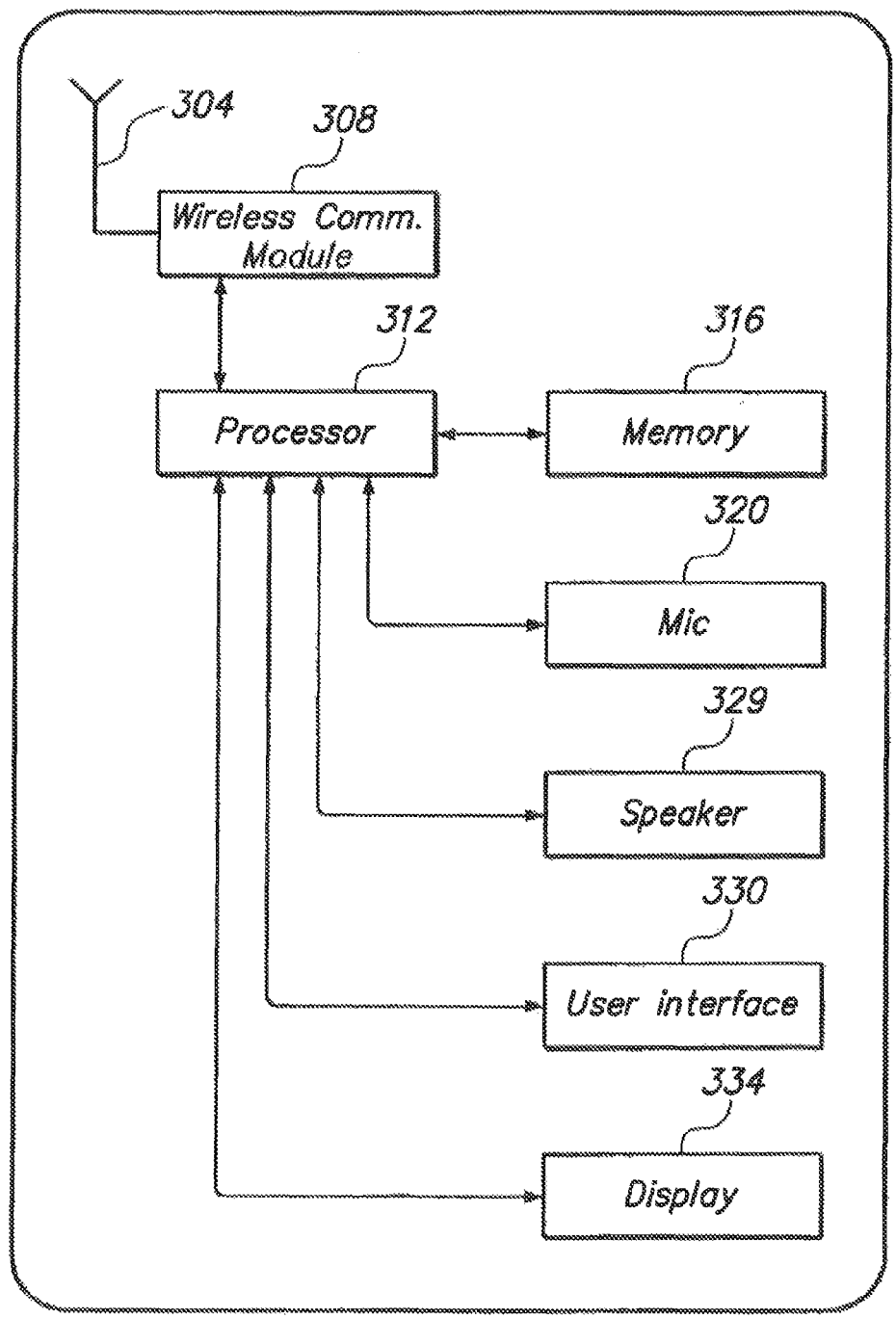
FIG. 3a is a schematic block diagram representation of a conventional cell phone.

It should be noted that the conventional cell phone, shown in FIG. 3a, includes an antenna 304 configured to send receive signals over a network. The antennas in the reader in FIG. 3 can also interface with one or more processors 312 in the cell phone. The one or more processors 312 are configured to execute machine readable code which is stored on computer readable media 316 (such as a memory, as shown). The one or more processors 312 are also configured to store computer readable code in the computer readable media 316. The mobile communication device shown in FIG. 3a also has a display 334 configured to present information, such as portions of the one or more video data streams, to a user. A user interface 330 is configured to receive user input and provided to the one or more processors 312. In one instance, the user interface 330 is configured as part of the display 334, as, for example, in a touch screen display. In the exemplary embodiment shown in FIG. 3a, the mobile communication device also includes a microphone 320 and a speaker 329.

Figure 3B:
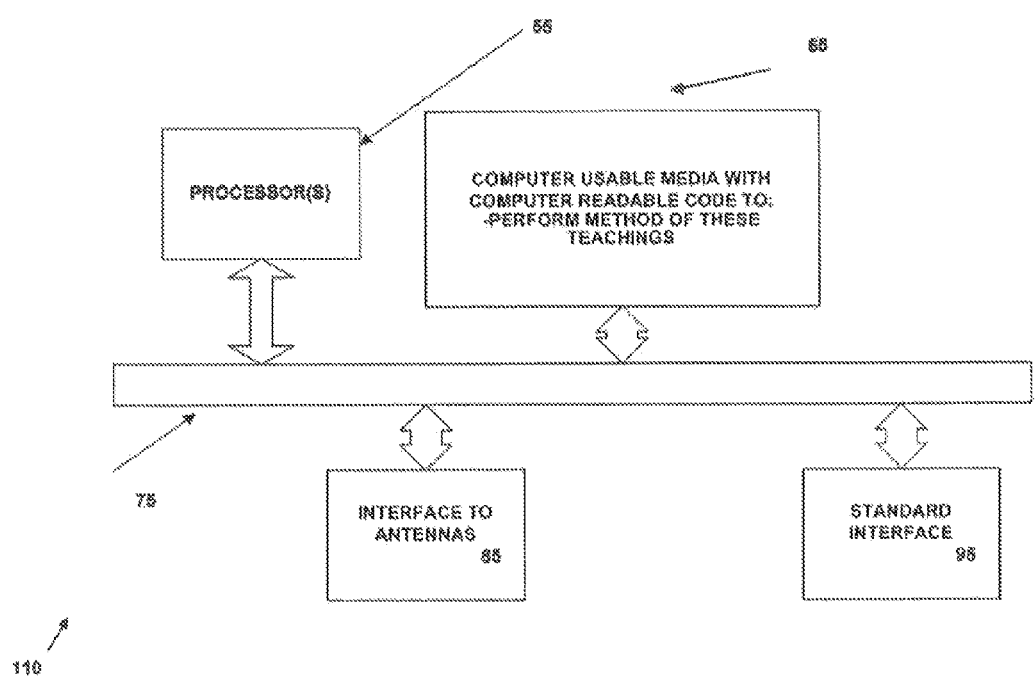
FIG. 3b is a schematic block diagram representation of generic reader component in one embodiment of the system of the present teachings.

Some of the parts of the conventional cell phone that are used in the present teachings can be described in a generic manner as shown in FIG. 3b. Referring to FIG. 3b, in the embodiment shown therein, in the component 110 shown, one or more processors 55 are operatively connected to computer usable media 65 that has computer readable code for performing the method of these teachings. An interface 85 to the receiver connected to the antennas, providing the received signal from the antennas, and a standard interface 95 are also operatively connected to the one or more processors 55. The operative connection is provided by a computer connection component 75 (such as a computer bus). In the embodiment shown in FIG. 3b, demodulation can be performed by means of computer readable code. In other embodiments, the output of the demodulator(s) can be provided through the interface 85. Embodiments in which the same functions are performed by programmable arrays or components specifically designed for the application are also within the scope of these teachings.

In order to further elucidate these teachings, detailed embodiments are presented herein below. These teachings are not limited only to the detailed embodiments.

The achievable distance resolution depends on the phase noise of the backscattered signal and the whole-system SNR. Assume the reader sends a continuous wave of s=S·cos$(2\pi f0t)$, the backscattered 2nd harmonic will take the form:

$$r = R \cos(4\pi f_0 t - 8\pi f_0 d/c + \phi) + n \quad (1)$$

Figure 4:
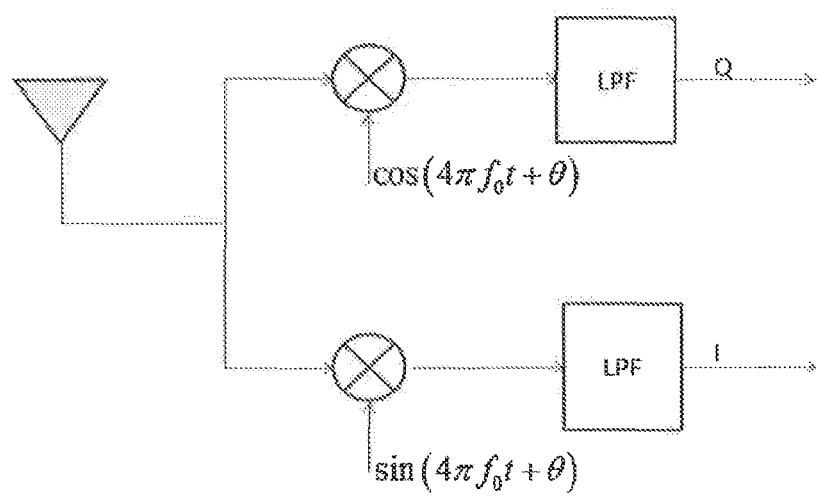
FIG. 4 is a schematic representation of a component in one embodiment of the system of these teachings.

Here, d is the distance between reader antenna and RFID antenna and c is the speed of light. The phase term $\phi$ denotes phase offset which is either a constant that can be compensated or encoded with the sensor $Z_{load}$ capacitance magnitude. The last term n is an additive Gaussian noise from the wireless channel which obeys distribution of N(0,σ2). In one instance the demodulator component used for demodulation of the backscattered signal implements quadrature scheme with the low-pass filters (LPF) as shown in FIG. 4. For the demodulator shown in FIG. 4, the quadrature output can be expressed as $$I = A \cos(8\pi f_0 d/c + \theta - \phi) + n_I \quad (2)$$

$$Q = A \sin(8\pi f_0 d/c + \theta - \phi) + n_Q \quad (3)$$

Averaging can be used, in one instance, to further minimize effect of noise. The distance could be evaluated after taking $$d = \frac{c}{8\pi f_0}\left[\tan^{-1}\left(\frac{Q}{I}\right) + \varphi - \theta\right] \quad (4)$$

It is suggested that the measured phase difference could be readily within 0.570 for $f_0$ around 3 GHz at a single measurement, this translate to distance error as small as 0.04 mm from Eq. (4). However, there is an integer ambiguity as the actual distance can be:

$$d_{actual} = d + \frac{\lambda_0}{4}n \quad (5)$$

In the present disclosure, the broadband nature of the harmonic backscattering from NLTL is utilized to resolve the integer ambiguity. In one embodiment of the method of the present disclosure, the second harmonic and one or more subharmonics of second harmonic in the backscattering from the NLTL are used to obtain the range and resolve the integer ambiguity. A wide variety of methods for obtaining the range from the second harmonic and one or more subharmonics of second harmonic are within the scope of these teachings. For example, methods such as used in harmonic radar (see, for example, B. G. Colpitts and G. Boiteau, "Harmonic radar transceiver design: miniature tags for insect tracking," in *IEEE Trans. Antennas and propagation*, vol. 52. no. 11. pp. 2825-2832, November 2004, and Farrukh Aslam, S. M. (2008) Wideband harmonic radar detection, Durham theses, Durham University, UK, which are Incorporated by reference herein in their entirety and for all purposes). In one embodiment, the second harmonic and one or more subharmonics of second harmonic are used. Due to the finite bandwidth in reflective NLTL for impedance matching, frequency at both $f_0$ and its subharmonic $f_0 + \Delta f$ are used.

$$I_1 = A_1 \cos(8\pi f_0 d/c + \theta_1 - \phi_1) + n_1^I \quad (6)$$

$$Q_1 = A_1 \sin(8\pi f_0 d/c + \theta_1 - \phi_1) + n_1^Q \quad (7)$$

$$I_2 = A_2 \cos[8\pi (f_0 + \Delta f) d/c + \theta_2 - \phi_2] + n_2^I \quad (8)$$

$$Q_2 = A_2 \sin[8\pi (f_0 + \Delta f) d/c + \theta_2 - \phi_2] + n_2^Q \quad (9)$$

From those equations above, the following is obtained, $$\frac{8\pi f_0 d}{c} = \xi_1 + 2n\pi \quad 0 \leq \xi_1 < 2\pi \quad (10)$$

$$\frac{8\pi (f_0 + \Delta f) d}{c} = \xi_2 + 2m\pi \quad 0 \leq \xi_2 < 2\pi \quad (11)$$

$$\frac{8\pi \Delta f_0 d}{c} = \beta; \beta = \xi_2 - \xi_1 + 2m\pi - 2n\pi \quad (12)$$

Here, $\beta$ satisfies $0 \leq \beta 2\pi$, and hence the range that this method can localize is:

$$0 \leq d < \frac{c}{4\Delta f} \quad (13)$$

Figure 7A:
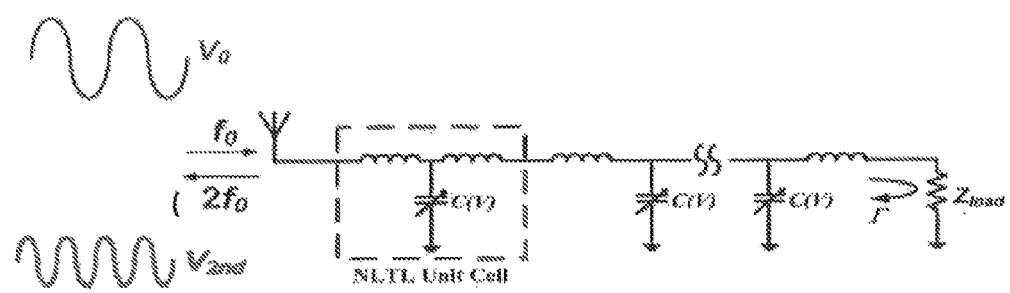
FIG. 7a is a graphical representation of the operation of one embodiment of the RFID tag of these teachings.
Figure 7B:
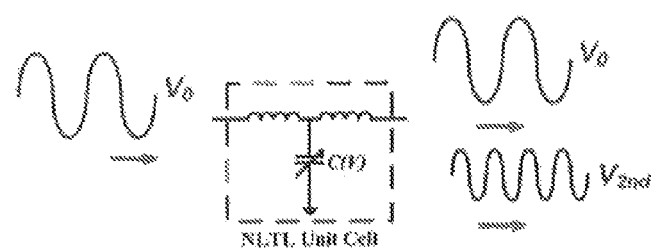
FIG. 7b is a graphical representation of generation of second harmonic in one embodiment of the RFID tag of these teachings.

In one embodiment of the RFID tag of these teachings, a single broadband dipole antenna served to both receive and transmit the signal, while a Schottky diode was used to generate the second harmonic (see FIGS. 7a-7b). However, additional area and loss impedance matching network are invoked, which consists of a 1 mm-diameter inductive loop and a single discrete diode. In addition, the harmonic conversion efficiency decreases with the increasing interrogation power, which imposes a strong limit to the communication range of 100 m even though a 4 kW reader power is used.

Figure 3C:
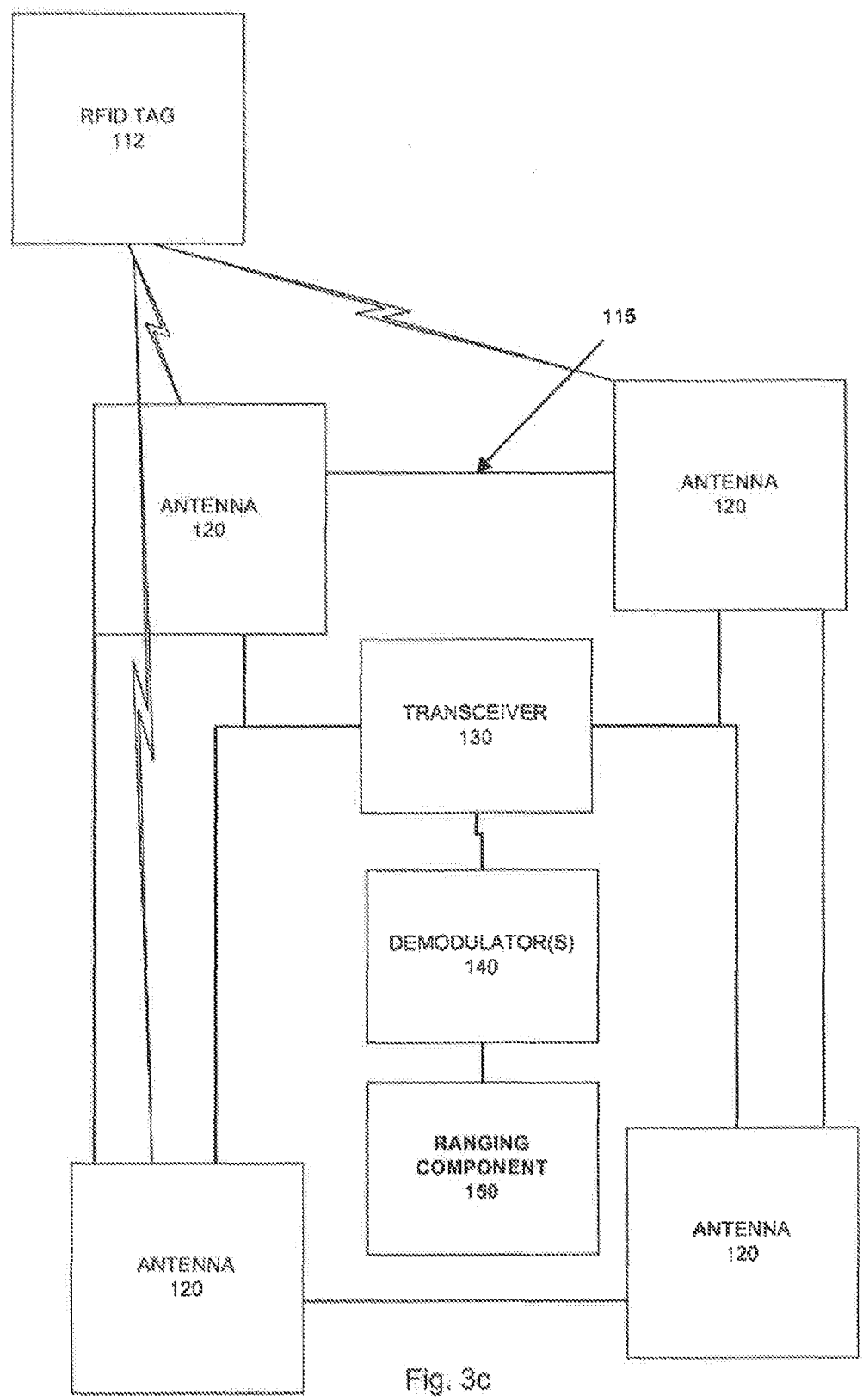
FIG. 3c is a schematic block diagram representation of generic representation of one embodiment of the system of the present teachings.

One embodiment of the system of these teachings, summarized from the embodiments disclosed hereinabove, is shown in FIG. 3c. Referring to FIG. 3c, in the embodiment shown therein, an RFID tag 112 is illuminated with electromagnetic radiation generated from the transceiver 130 and one or more antennas 120. The RFID tag 112 comprises at least one NLTL for broadband harmonic generation so that a second harmonic of a principal frequency of the illuminating radiation and one or more subharmonics of the second harmonic are produced by the NLTL ass backscatter radiation. The backscatter radiation is received by the three or more antennas 120, where the coordinates of the location of the three or more antennas are known. The output of the three or more antennas is provided to a receiving component (such as transceiver 130) and provided, from the receiving component, to one or more demodulators 140, producing inphase and quadrature components for the second harmonic and the one or more subharmonics of the second harmonic. A ranging component 150 obtained the range (distance) from the RFID tag 112 to each of the locations of the three or more antennas 120. The location of the RFID tag is found by trilaterating from the distances (range). In one embodiment, the ranging component 150 can be a configuration is shown in FIG. 3b. In other embodiments, the ranging component (including trilateration) can be performed by programmable arrays or components specifically designed for the operation.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Control and data information can be electronically executed and stored on computer-readable medium. Common forms of computer-readable (also referred to as computer usable) media can include, but are not limited to including, for example, a floppy disk, a flexible disk, a hard disk, magnetic tape, or any other magnetic medium, a CDROM or any other optical medium, punched cards, paper tape, or any other physical or paper medium, a RAM, a PROM, and EPROM, a FLASH-EPROM, or any other memory chip or cartridge, or any other non-transitory medium from which a computer can read. As stated in the USPTO 2005 Interim Guidelines for Examination of Patent Applications for Patent Subject Matter Eligibility, 1300 Off. Gaz. Pat. Office 142 (Nov. 22, 2005), on the other hand, from a technological standpoint, a signal encoded with functional descriptive material is similar to a computer-readable memory encoded with functional descriptive material, in that they both create a functional interrelationship with a computer. In other words, a computer is able to execute the encoded functions, regardless of whether the format is a disk or a signal.

Although the invention has been described with respect to various embodiments, it should be realized these teachings are also capable of a wide variety of further and other embodiments within the spirit and scope of the appended claims.

What is claimed is:

1. A method for localization of an object in indoor environments, the method comprising: illuminating a sensor tag with electromagnetic radiation generated from a transceiver; the transceiver being located a distance away from the sensor tag; the sensor tag comprising at least one nonlinear transmission line (NLTL) for broadband harmonic generation;
receiving backscattered electromagnetic radiation from the at least one NLTL at three or more locations; coordinates of the three or more locations being known;
obtaining, from phase and magnitude outputs at a second harmonic and at least one subharmonic of second harmonic, a distance from the sensor tag to each of the three or more locations; and
trilaterating a location of the sensor tag.

2. The method of claim 1 wherein the NLTL is a through structure comprising one antenna at one end and another antenna at another end.

3. The method of claim 1 wherein the NLTL is terminated by an impedance.

4. The method of claim 3 wherein the NLTL is terminated by an open circuit.

5. The method of claim 3 wherein the NLTL is terminated by a short circuit.

6. The method of claim 1 wherein obtaining range from the sensor tag to each of the three or more locations comprises:
generating, for said each three or more locations, from received backscattered electromagnetic radiation, inphase and quadrature outputs at a second harmonic of a principal frequency of the electromagnetic radiation emitted from the transceiver and at a subharmonic of the second harmonic; and
obtaining, from the inphase and quadrature outputs at the second harmonic and at the subharmonic, a distance from each one of said three or more locations to the sensor tag.

7. A system for localization of an object in indoor environments, the system comprising:
a sensor tag comprising at least one nonlinear transmission line (NLTL) for broadband harmonic generation;
a transceiver; and
a reader comprising:
three or more antennas, each one antenna from the three or more antennas being located at one location from three or more locations; coordinates of the three or more locations being known;
at least one demodulator providing inphase and quadrature outputs at a second harmonic of a principal frequency of the electromagnetic radiation emitted from the transceiver and at one or more subharmonics of the second harmonic; and
a ranging component configured to provide, from the inphase and quadrature outputs at the second harmonic and at the one or more subharmonics, a distance from each one of said three or more locations to the sensor tag.

8. The system of claim 7 wherein one subharmonic is used; and wherein the ranging component is configured to obtain, from the in phase and quadrature outputs at the second harmonic and at the subharmonic, a distance from each one of said three or more locations to the sensor tag.

9. The system of claim 7 wherein the NLTL is a through structure comprising one antenna at one end and another antenna at another end.

10. The system of claim 7 wherein the NLTL is terminated by an impedance.

11. The system of claim 10 wherein the NLTL is terminated by a short circuit.

12. The system of claim 10 wherein the NLTL is terminated by an open circuit.

13. The system of claim 7 wherein the transceiver is incorporated into the reader and includes one of the three or more antennas.

14. The system of claim 7 wherein the at least one demodulator comprises:
two downmixing components, one downmixing component multiplying an input signal by a cosine function and another downmixing component multiplying an input signal by a sine function; and
two low pass filters, each lowpass filter connected to one of the two downmixing components.

15. A method for localization of an object in indoor environments, the method comprising:
illuminating a sensor tag with electromagnetic radiation generated from a transceiver; the transceiver being located a distance away from the sensor tag;
the sensor tag comprising at least one nonlinear transmission line (NLTL) for broadband harmonic generation;
receiving backscattered electromagnetic radiation from at least three or more locations; coordinates of the three or more locations being known;
obtaining from phase and magnitude outputs at a second harmonic frequency, a distance from the sensor tag to each of the three or more locations; and
trilaterating a location of the sensor tag.

16. The method of claim 15 wherein the NLTL is a through structure comprising one antenna at one end and another antenna at another end.

17. The method of claim 15 wherein the NLTL is terminated by an impedance.

18. The method of claim 17 wherein the NLTL is terminated by an open circuit.

19. The method of claim 18 wherein the NLTL is terminated by a short circuit.

20. The method of claim 15 wherein obtaining range from the sensor tag to each of the three or more locations comprises:

generating, for said each three or more locations, from received backscattered electromagnetic radiation, in phase and quadrature outputs at a second harmonic of a principal frequency of the electromagnetic radiation emitted from the transceiver; and obtaining, from the in phase and quadrature outputs at the second harmonic, a distance from each one of said three or more locations to the sensor tag.

21. A system for localization of an object in indoor environments, the system comprising:

a sensor tag comprising at least one nonlinear transmission line (NLTL) for broadband harmonic generation;

a transceiver; and a reader comprising:

three or more antennas, each one antenna from the three or more antennas being located at one of three or more locations; coordinates of the three or more locations being known;

at least one demodulator providing in-phase and quadrature outputs at a second harmonic of a principal frequency of the electromagnetic radiation emitted from the transceiver; and a ranging component configured to provide, from the in-phase and quadrature outputs at the second harmonic, a distance from each one of said three or more locations to the sensor tag.

22. The system of claim 21 wherein the ranging component is configured to obtain, from the in-phase and quadrature outputs at the second harmonic, a distance from each one of said three or more locations to the sensor tag.

23. The system of claim 21 wherein the NLTL is a through structure comprising one antenna at one end and another antenna at another end.

24. The system of claim 21 wherein the NLTL is terminated by an impedance.

25. The system of claim 24 wherein the NLTL is terminated by a short circuit.

26. The system of claim 24 wherein the NLTL is terminated by an open circuit.

27. The system of claim 21 wherein the transceiver is incorporated into the reader and includes one of the three or more antennas.

28. The system of claim 21 wherein the at least one demodulator comprises:

two downmixing components, one downmixing component multiplying an input signal by a cosine function and another downmixing component multiplying an input signal by a sine function; and two low pass filters, each lowpass filter connected to one of the two downmixing components.

* * * * *

UNITED STATES PATENT AND TRADEMARK OFFICE
CERTIFICATE OF CORRECTION

PATENT NO.        : 9,645,234 B2
APPLICATION NO.   : 14/413523
DATED             : May 9, 2017
INVENTOR(S)       : Edwin C. Kan et al.

It is certified that error appears in the above-identified patent and that said Letters Patent is hereby corrected as shown below:

On the Title Page

At Item (71), "Edwin C. Khan" should read -- Edwin C. Kan --

Signed and Sealed this
Seventeenth Day of October, 2017

Joseph Matal
*Performing the Functions and Duties of the
Under Secretary of Commerce for Intellectual Property and
Director of the United States Patent and Trademark Office*